W. B. GILMORE.
ANIMAL TRAP.
APPLICATION FILED JUNE 1, 1920.
1,384,890.
Patented July 19, 1921.
2 SHEETS—SHEET 1.
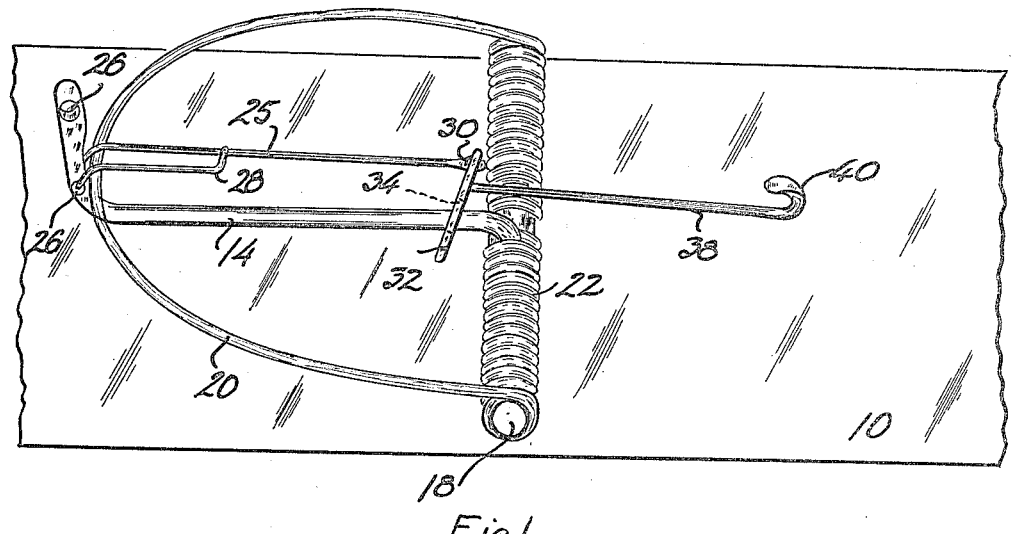
Fig. 1.
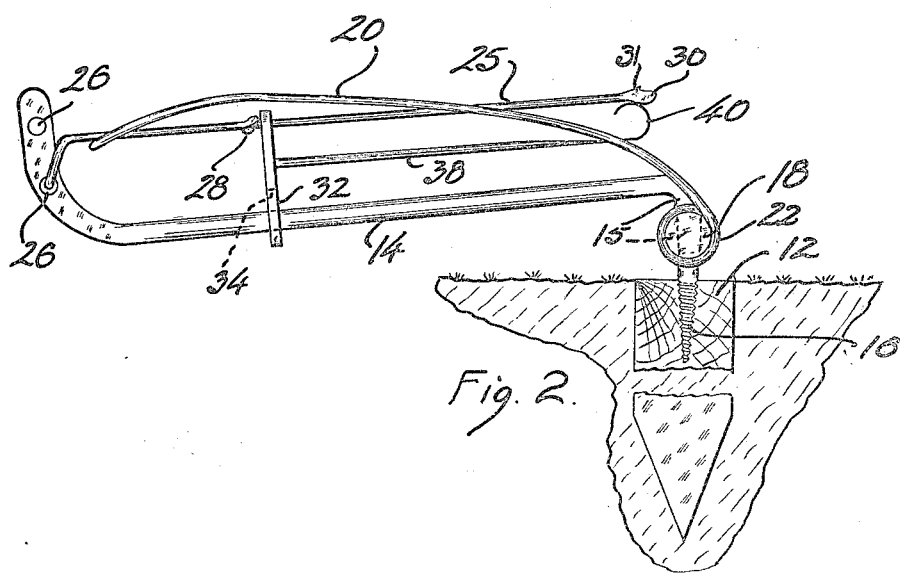
Fig. 2.
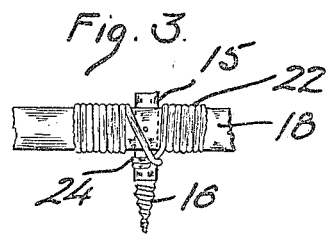
Fig. 3.
Inventor
W. B. Gilmore
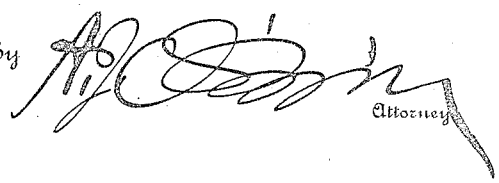
Attorney W. B. GILMORE.
ANIMAL TRAP.
APPLICATION FILED JUNE 1, 1920.
1,384,890.
Patented July 19, 1921.
2 SHEETS—SHEET 2.
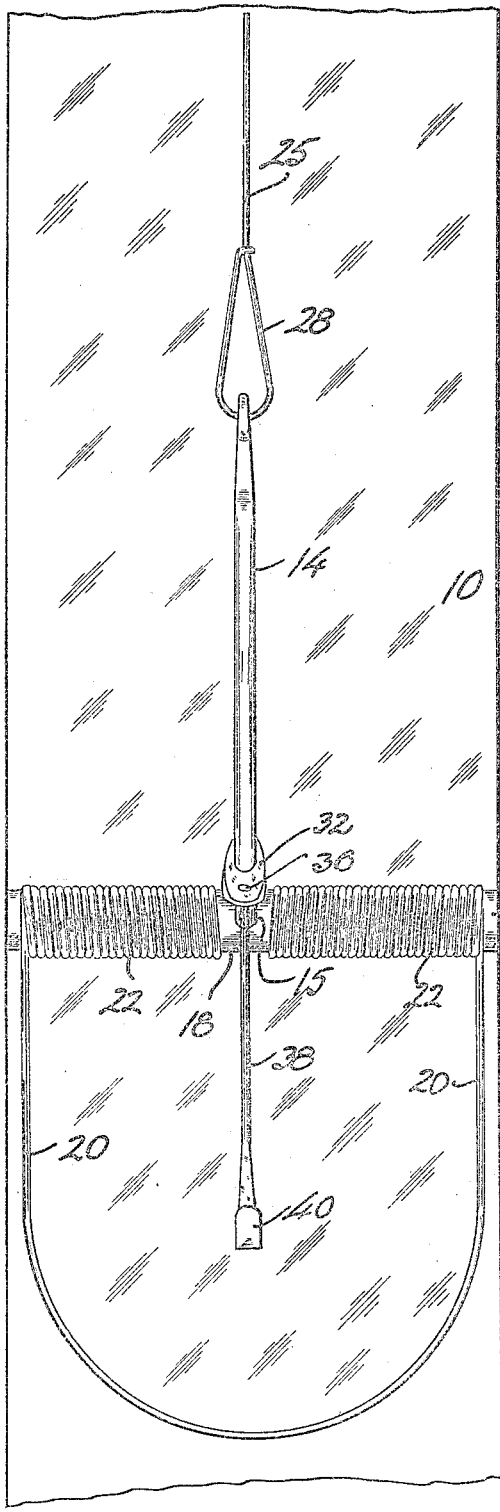
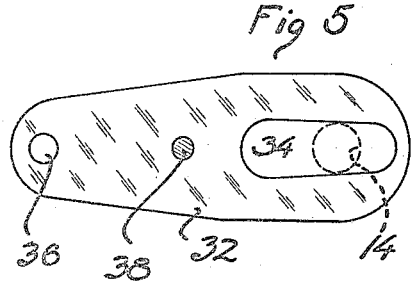
Inventor
W. B. Gilmore.
By
Attorney

UNITED STATES PATENT OFFICE.

WILLIS B. GILMORE, OF IDAHO SPRINGS, COLORADO.

ANIMAL-TRAP.

1,384,890. Specification of Letters Patent. Patented July 19, 1921.

Application filed June 1, 1920. Serial No. 385,599.

*To all whom it may concern:*

Be it known that I, WILLIS B. GILMORE, a citizen of the United States, residing at Idaho Springs, county of Clear Creek, and State of Colorado, have invented certain new and useful Improvements in Animal-Traps; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide an animal trap, the operating parts of which may be compactly assembled for transportation, and which may be attached to any rigid base whereby the necessity for a permanent base is eliminated.

It is also an object to provide a device which is thoroughly efficient, which may be handled with safety when folded up and which has some range of adjustment of the bait-holding member for use with different animals.

Briefly, the invention comprises a main arm connected with a spring bail whose ends are coiled to provide springs, the extremities of the spring portions being fixed with relation to the said arm. The arm carries a trigger adapted to hold the bail in set position, and a trigger plate is movably mounted upon the main arm in position to engage the trigger, and carries a bait-holding member adapted to move said plate to release the trigger. The main arm may be mounted on any rigid support.

In the drawings:

Figure 1 is a perspective showing the device mounted upon a board in set position.

Fig. 2 shows the device in side elevation in folded position for transportation or for mounting upon a support or for removing therefrom.

Fig. 3 is a detail of the connection between the main arm and the spring portions.

Fig. 4 is a plan showing the device in sprung position.

Fig. 5 is an enlarged detail of the trigger plate.

The device is adapted to be mounted upon a board 10, as in Figs. 1 and 4, or in the stake 12, as in Fig. 2, or upon any other suitable support. The invention comprises a main supporting arm 14 adapted when in operative position to be substantially horizontal, as in Figs. 1 and 2. This arm has an offset, vertically disposed stem 15, whose lower end may be threaded as at 16, for mounting on the base. The offset stem 15 passes through and is rigidly fixed in a spindle 18. A bail 20 is provided, whose end portions are in the form of coil springs 22, wrapped around the spindle 18, the extremities 24 of said portions being fixed to the offset stem 15 below the spindle 18 as shown in Fig. 3. A trigger 25 is mounted in either of a pair of holes 26, in the free end of the supporting arm 14, the trigger 25 being provided with a looped portion 28 as shown. The free extremity of the trigger 25 is provided with a catch 30, having a shoulder 31 (Fig. 2). A trigger plate 32 is provided in its lower end with an elongated tapered slot 34, through which the arm 14 extends for relatively slidable movement. The opposite end of the plate 32 is provided with a trigger-receiving aperture 36, while a bait-holding rod 38 is fixedly mounted in said plate 32 at one end, its opposite end being equipped with a bait-receiving hook 40.

In operation, the bail 20 is pulled down into the position shown in Figs. 1 and 2. The trigger 25 is then swung down over the bail to hold the same. The trigger plate 32 is pulled forward far enough for its upper end to free the large portion 30, whereupon the aperture 36 is swung into engagement with said latch 30 and against the shoulder 31. By moving the lower end of the plate either to the right or to the left in Fig. 1, the bait hook 40 may be set as high or as low as desired. When the trap is sprung, the parts will assume the position shown in Fig. 4.

In order to handle the trap, as for attaching to or detaching from a base, the plate will be slid along both the arm 14 and the trigger 25 to the position shown in Fig. 2. In this position the trap is firmly locked and may be easily handled. After it is mounted upon a base, it is merely necessary in order to set the same, to press down upon the trigger 25 and draw the plate 32 out to the position of Fig. 1.

It will be noted that the wider portion of the tapered slot 34 permits plate 32 to slide freely upon arm 14, but when in set position intermediate points of the side walls of the slot bind upon arm 14 and securely retain the plate 32 in said set position.

I claim:

1. A trap comprising a main arm adapted to be affixed to a suitable base, a trigger mounted on said arm, a spring bail connected with said main arm, and a bait holder mounted on said arm, slidable in the direction of the length of the trigger and adapted to releasably engage one end of the trigger, said trigger being adapted to retain the bail in set position.

2. A trap comprising a main arm adapted to be affixed to a suitable base, a trigger movably connected with said arm, a spring bail connected with said arm and adapted to be engaged and held in set position by said trigger, a member slidable on said arm and adapted to engage and retain the free end of the trigger, and a bait-holding element connected with said member.

3. A trap comprising a main arm adapted to be affixed to a suitable base, a trigger movably connected with said arm, a spring bail connected with said arm and adapted to be engaged and held in set position by said trigger, a member slidable on said arm and adapted to engage and retain the free end of the trigger, and a bait-holding element connected with said member, said member being adapted also for sliding movement along said trigger to lock the same in bail-retaining position.

4. A trap comprising a main arm adapted to be affixed to a base, a trigger arm movably mounted thereon, a spring bail connected with the main arm, a member slidably mounted on one of said arms and adapted to releasably engage the other arm whereby said arms are retained in set position for the holding of the bail in set position, and a bait-holding device carried by the said member, said member being adapted also to slide along said one arm to lock the trigger in bail-retaining position.

5. A trap comprising a main arm, a spring bail connected therewith, a trigger adapted to retain said bail in set position, and a bait-holder to engage the main arm and the trigger to retain the same in set relation and slidable in the direction of the length of the trigger.

6. A trap comprising a main arm adapted to be affixed to a suitable base, a trigger movably connected with said arm, a spring bail connected with said arm and adapted to be engaged and held in set position by said trigger, a member slidable on said arm and adapted to engage and retain the free end of the trigger, and a bait-holding element connected with said member, said member having a tapered slot therein through which said arm passes, the width of the slot at an intermediate point being equal to the diameter of the arm.

In testimony whereof I affix my signature.

WILLIS B. GILMORE.